July 9, 1940.  W. F. BETZELL  2,207,451
PULL RIM
Filed June 8, 1939
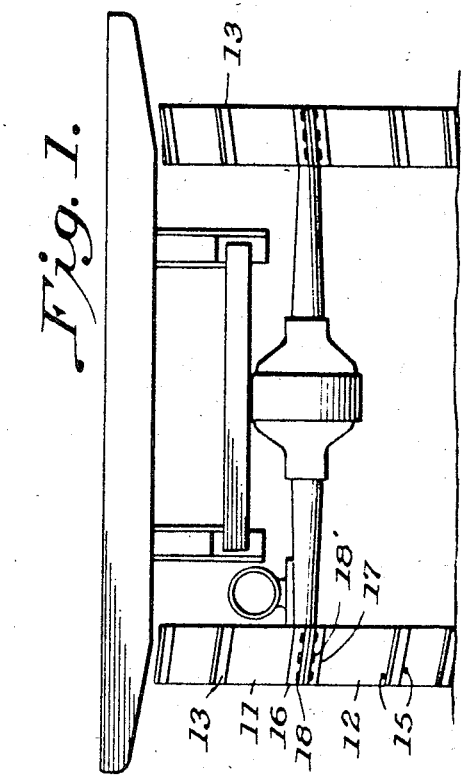
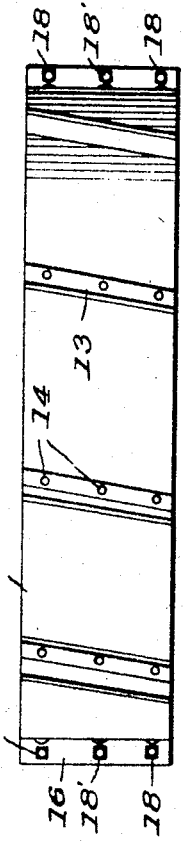
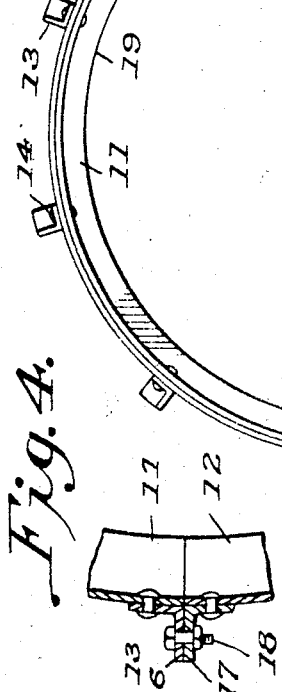
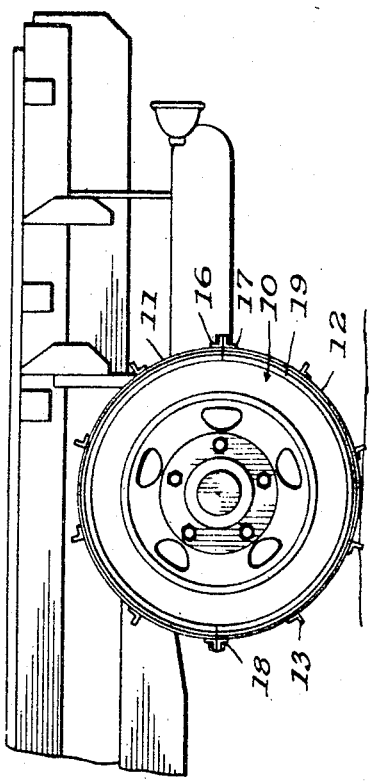
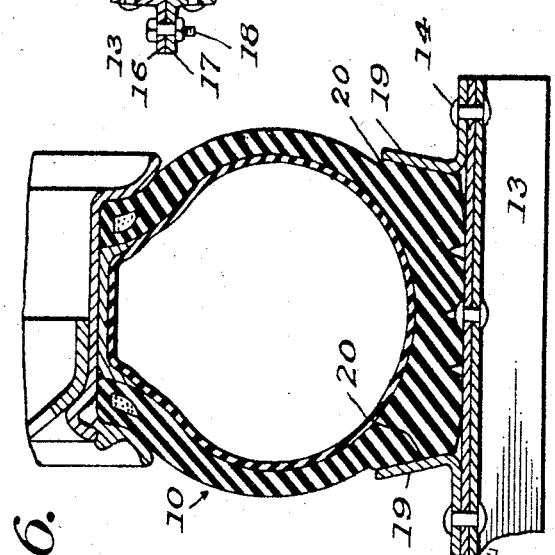
Inventor
WILLIAM F. BETZELL
By Theodore A. Hostetler
Attorney Patented July 9, 1940

2,207,451

UNITED STATES PATENT OFFICE 2,207,451

PULL RIM

William F. Betzell, Washington, D. C.

Application June 8, 1939, Serial No. 278,144

3 Claims. (Cl. 152—56)

This invention relates to a new and useful pull rim for use with automobile or truck wheels when it is desired to use the automobile or truck for traction purposes, particularly on ground that is yielding.

A further object of the invention is to provide a pull rim that can be easily and quickly attached to and detached from a vehicle wheel.

Another object of the invention is to provide a pull rim that can be readily attached to a standard tire of proper dimensions without any modification of the tire or of the pull rim.

A further object of the invention is to provide a pull rim that is simple, durable and efficient and which can be manufactured and sold at a comparatively low cost.

A further object of the invention is to provide practical means for converting a truck or automobile wheel into a traction wheel.

Other objects of the invention are apparent from the description of the invention and the novel features of construction, combination and arrangement of parts as herein more fully described and claimed, reference being had to the accompanying drawing in which:

Figure 1 is a diagrammatic rear view of a truck or automobile with a pull rim mounted upon each of the rear wheels.

Figure 2 is a side view of a part of a truck illustrating the pull rim mounted upon the wheel.

Figure 3 is a side view of one section of the pull rim and illustrating the means for securing two sections of the rim together.

Figure 4 is an enlarged view in vertical section illustrating the means for securing two sections of the rim together.

Figure 5 is a plan view of the pull rim.

Figure 6 is a view in cross section illustrating the pull rim mounted upon a wheel having a pneumatic tire.

In the drawing the numeral 10 denotes a pneumatic or cushioned tire upon which the pull rim is mounted. The rim may be formed of two or more curved sections, 11 and 12, having a series of cleats or lugs 13 forming traction elements mounted transversely and obliquely across the tread surfaces of the curved sections, as shown in Figures 1 and 5. These cleats or lugs may be mounted on the sections by means of rivets 14 or they may be welded thereon as at 15. The ends of the curved sections, or members 11 and 12, are provided with upstanding lugs 16, 17 which are perforated to receive bolts 18 and 18' for securing the sections together, thereby providing adjustable means for clamping the curved sections firmly upon the tire. These upstanding lugs may be riveted or welded upon the ends of the sections or may be made integral therewith.

The curved sections 11 and 12 are substantially wider than the transverse diameter of the tire and are provided with marginal flanges 19 formed of angle-iron shaped material, one side of which is secured to the inside marginal surfaces of the sections with the free sides positioned at a distance from the edges of the sections and extending radially and inwardly to conform generally to the edges of the tread portion 20 of an automobile or truck tire. The flanges 19 on opposite sides of the rim are slightly flared with respect to each other as shown in Figure 6 thereby serving to clamp the edges of the tire tread when the rim is drawn or clamped about the tread. Instead of forming continuous marginal flanges 19 on the sections, parts of the flanges may be cut away to leave a series of upstanding projections. When the pull rim is secured to the tire upon the wheel the flanges 19 will prevent displacement or slipping movement of the pull rim either sidewise or peripherally due to the frictional engagement of the sections and the flanges with the tire. The lugs 13 by sloping in opposite directions on a pair of wheels as shown in Figure 1, equalize the side pulling tension of the respective wheels and form efficient anti-slipping traction elements.

When the pull rim is used upon pneumatic tires, the tension of the rim may be adjusted by means of the bolts 18 or by proper inflation of the tire. The intermediate bolt 18' should be a fairly long bolt to draw the ends of the sections together, after which the shorter bolts 18 may be inserted and a shorter bolt substituted for the long bolt 18'.

The pull rim may be easily applied to a wheel by placing one end of the curved section under the wheel and then moving the vehicle so that the wheel will roll into position upon the curved section. The other section or sections may then be placed upon the unobstructed portion of the wheel.

The details of the construction shown may be altered without departing from the spirit of the invention.

I claim:

1. A pull rim for a vehicle wheel with a pneumatic tire having a projecting tread portion thereon, said pull rim comprising a plurality of band members substantially wider than the transverse diameter of the tire and forming a cylindrical rim shaped to fit around the tread of the tire, flared marginal flanges mounted on the band members to extend radially inward at a distance from the margin of the band members to clamp the edges of the projecting tread portions of the tire, means on the ends of the band members to clamp the band members and flanges about the tire to prevent relative movement of the tire and band members and traction devices mounted transversely on the band members.

2. A pull rim for a vehicle wheel with a pneumatic tire having a projecting tread portion, comprising a plurality of curved members substantially wider than the transverse diameter of the tire and having means at each of the ends to connect the members together to form a circular band adapted to be clamped about the projecting tread face of the tire, flared flanges mounted on the inner side of the band members at a distance from the margins of the band members so as to clamp the side edges of the tread portions of the tire, whereby the tread portion of the tire is securely clamped between the flanges and the curved members, and cleats forming traction members mounted on the rims.

3. A pull rim for a pneumatic tire having a projecting tread portion, comprising a plurality of band members substantially wider than the transverse diameter of the tire, means to adjustably connect the ends of the band members together to form the pull rim, curved members of angle-iron shape mounted with one side upon the margins of the band members and with the other free side positioned at a distance from the edges of the band members to form flanges to clamp the sides of the tread portions of the tire, whereby the margins of the pull rim are reinforced to hold the rim rigidly upon the tread of the tire and traction members mounted on the rim.

WILLIAM F. BETZELL.